United States Patent
Popp et al.

(10) Patent No.: US 11,927,211 B2
(45) Date of Patent: Mar. 12, 2024

(54) FASTENING METHOD AND FASTENING SYSTEM

(71) Applicant: HILTI AKTIENGESELLSCHAFT, Schaan (LI)

(72) Inventors: Uwe Popp, Widnau (CH); Simon Stahel, Chur (CH); Jens Schneider, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 341 days.

(21) Appl. No.: 16/499,000

(22) PCT Filed: Apr. 18, 2018

(86) PCT No.: PCT/EP2018/059914
§ 371 (c)(1),
(2) Date: Sep. 27, 2019

(87) PCT Pub. No.: WO2018/192979
PCT Pub. Date: Oct. 25, 2018

(65) Prior Publication Data
US 2020/0049179 A1 Feb. 13, 2020

(30) Foreign Application Priority Data
Apr. 19, 2017 (EP) .................. 17167112

(51) Int. Cl.
*F16B 4/00* (2006.01)
(52) U.S. Cl.
CPC .................. *F16B 4/004* (2013.01)

(58) Field of Classification Search
CPC ... B25F 3/00; B25C 1/08; F16C 35/02; H01R 13/14; H01R 13/41; B23P 19/00; B23P 11/00; F16B 4/004; F16B 5/08
See application file for complete search history.

(56) References Cited

U.S. PATENT DOCUMENTS

| | | |
|---|---|---|
| 3,555,957 A | 1/1971 | Hermle |
| 4,850,772 A | 7/1989 | Jenkins |
| 5,415,772 A | 5/1995 | Garcera et al. |
| 5,468,384 A | 11/1995 | Garcera et al. |
| 5,875,953 A | 3/1999 | Shioya |

(Continued)

FOREIGN PATENT DOCUMENTS

| | | |
|---|---|---|
| CN | 1105601 A | 7/1995 |
| CN | 101076427 A | 11/2007 |

(Continued)

OTHER PUBLICATIONS

Yamazaki, Hiroshi; JP-2010190342-A; Machine Translation (Year: 2010).*

(Continued)

*Primary Examiner* — Lee A Holly
(74) *Attorney, Agent, or Firm* — Leydig, Voit & Mayer, Ltd.

(57) ABSTRACT

Disclosed are a fastening system and a method for fastening a fastening element made of a first material to a substrate made of a substrate material. A blind hole is made in the substrate, and a fastening element is anchored in the blind hole. A shaft of the fastening element defines a fastening direction and has a circumferential surface which is slanted or stepped in relation to the fastening direction.

26 Claims, 2 Drawing Sheets

(56) References Cited

U.S. PATENT DOCUMENTS

| | | |
|---|---|---|
| 5,944,563 A | 8/1999 | Nagafuji |
| 6,042,429 A * | 3/2000 | Bianca .................. H01R 13/41 |
| | | 439/78 |
| 6,401,359 B1 | 6/2002 | Amano |
| 7,241,021 B2 * | 7/2007 | Hannington ............ G09F 13/20 |
| | | 362/20 |
| 7,909,229 B2 | 3/2011 | Fukuda |
| 8,047,740 B2 * | 11/2011 | Christ .................. B23K 20/1295 |
| | | 403/280 |
| 8,151,431 B2 | 4/2012 | Hashimoto et al. |
| 8,181,329 B2 | 5/2012 | Buhri et al. |
| 8,277,923 B2 | 10/2012 | Christ |
| 8,517,654 B2 | 8/2013 | Buhri et al. |
| 9,109,580 B2 | 8/2015 | Markgraf et al. |
| 10,746,211 B2 | 8/2020 | Foser |
| 2002/0159856 A1 | 10/2002 | Buhri |
| 2003/0012619 A1 | 1/2003 | O'Banion |
| 2008/0101857 A1 | 5/2008 | Christ |
| 2009/0236028 A1 | 9/2009 | Fukuda |
| 2010/0047014 A1 | 2/2010 | Buhri et al. |
| 2010/0111640 A1 | 5/2010 | Buhri et al. |
| 2010/0186900 A1 | 7/2010 | Christ |
| 2012/0114379 A1 * | 5/2012 | Yamashita ............... G03G 5/00 |
| | | 430/69 |
| 2012/0324978 A1 | 12/2012 | Maloney |
| 2013/0081252 A1 * | 4/2013 | Markgraf ................ F03D 13/20 |
| | | 29/432 |
| 2013/0241319 A1 | 9/2013 | Shimura et al. |
| 2014/0191009 A1 * | 7/2014 | Mayer ...................... B25C 1/08 |
| | | 220/560.04 |
| 2015/0096778 A1 * | 4/2015 | Schneider ................ B25F 3/00 |
| | | 173/213 |
| 2016/0053799 A1 | 2/2016 | Anasis et al. |
| 2016/0327036 A1 * | 11/2016 | Ishii ........................ F16C 35/02 |
| 2017/0097025 A1 | 4/2017 | Foser |
| 2017/0097024 A1 | 6/2017 | Drivon et al. |
| 2020/0049179 A1 | 2/2020 | Popp et al. |

FOREIGN PATENT DOCUMENTS

| | | |
|---|---|---|
| CN | 101309775 A | 11/2008 |
| CN | 101501347 A | 8/2009 |
| CN | 101730606 A | 6/2010 |
| CN | 101737394 A | 6/2010 |
| CN | 104074551 A | 10/2014 |
| CN | 103032273 B | 5/2017 |
| CN | 106415027 B | 11/2019 |
| CN | 110506166 A | 11/2019 |
| CN | 110506166 B | 1/2021 |
| DE | 1 625 383 A | 7/1972 |
| DE | 202 09 675 U1 | 10/2002 |
| DE | 10 2008 041 409 A1 | 2/2010 |
| EP | 0 337 813 A1 | 10/1989 |
| EP | 2 157 322 A1 | 2/2010 |
| GB | 1 228 635 A | 4/1971 |
| GB | 1244289 A | 8/1971 |
| GB | 2 233 923 A | 1/1991 |
| JP | S5830510 A | 2/1983 |
| JP | H02217604 A1 | 8/1990 |
| JP | H5-62712 U | 8/1993 |
| JP | H8-69828 A | 3/1996 |
| JP | H8-141848 A | 6/1996 |
| JP | H0966421 A1 | 3/1997 |
| JP | 2000-21869 A | 1/2000 |
| JP | 2001-56010 A | 2/2001 |
| JP | 2003-205373 A | 7/2003 |
| JP | 2004-26289 A | 1/2004 |
| JP | 2004-335409 A | 11/2004 |
| JP | 2007-138192 A | 6/2007 |
| JP | 2007-285213 A | 11/2007 |
| JP | 2010190342 A * | 9/2010 |
| JP | 2010190342 A | 9/2010 |
| KR | 97-45753 A | 7/1997 |
| KR | 10-2010-0023761 A | 3/2010 |
| KR | 10-1319201 B1 | 10/2013 |
| KR | 10-1451071 B1 | 10/2014 |
| KR | 10-1456139 B1 | 11/2014 |
| KR | 10-1543167 B1 | 8/2015 |
| KR | 101555715 B1 | 9/2015 |
| KR | 10-1660801 B1 | 10/2016 |
| SE | 393762 B | 5/1977 |
| TW | 1221890 B | 4/1991 |
| WO | WO 2006/061203 A1 | 6/2006 |

OTHER PUBLICATIONS https://web.archive.org/web/20161229081438/https://en.wikipedia.org/wiki/Interference_fit (Year: 2016).*

JP-2010190342-A; Yamazaki, Hiroshi; Machine translation (Year: 2010).*

International Bureau, International Search Report in International Application No. PCT/EP2018/059914, dated Jun. 18, 2018.

"Interference fit", *Wikipedia*, URL: https://en.wikipedia.org/wiki/Interference_fit, last edited Sep. 12, 2022.

* cited by examiner

FASTENING METHOD AND FASTENING SYSTEM

CROSS-REFERENCE TO RELATED APPLICATIONS

This patent application is the U.S. National Stage of International Patent Application No. PCT/EP2018/059914, filed Apr. 18, 2018, which claims the benefit of European Patent Application No. 17167112.6, filed Apr. 19, 2017, which are each incorporated by reference.

The present invention relates to a method for fastening a fastening element to a substrate, in which a blind hole is made in the substrate and a fastening element is anchored in the blind hole. Furthermore, the invention relates to a fastening system having a substrate and a fastening element attached thereto.

BACKGROUND OF THE INVENTION

Fastening methods and systems are known in which a shaft of the fastening element has an end face pointing in a fastening direction, i.e. is blunt, with a circumferential surface adjoining the end face. The outer dimensions of the end face exceed a diameter of the blind hole, so that when driven into the blind hole the shaft displaces a part of the substrate material and is welded on the substrate at the circumferential surface. The welding contributes to the holding force of the fastening element to the substrate.

BRIEF SUMMARY OF THE INVENTION

The object of the present invention is to provide a fastening method and a fastening system in which a large holding force of the fastening element is ensured on the substrate at a given blind hole depth.

The object is achieved, on the one hand, by a method for fastening a fastening element consisting of a first material to a substrate consisting of a substrate material, in which a blind hole defining a depth direction with a blind hole diameter is made in the substrate, a fastening element is provided which has a shaft defining a fastening direction having an end face pointing substantially in the fastening direction and having a circumferential surface immediately adjacent to the end face, and the shaft is driven into the blind hole to anchor the fastening element in the blind hole. The outer dimensions of the end face exceed the blind hole diameter, so that when driven into the blind hole the shaft displaces a part of the substrate material in the depth direction and is welded on the substrate at the circumferential surface. The circumferential surface is slanted or stepped in relation to the fastening direction.

On the other hand, the object is achieved by a fastening system comprising a substrate consisting of a substrate material and a fastening element which has a shaft defining a fastening direction having an end face pointing substantially in the fastening direction and having a circumferential surface adjoining directly to the end face, wherein the shaft is welded on the substrate, and wherein the circumferential surface is slanted or stepped relative to the fastening direction.

An advantageous embodiment is characterized in that the fastening element has an anchoring region, which is anchored in the blind hole and includes the shaft, and a connecting region protruding from the base element after the anchoring for connecting an attachment to the fastening element.

An advantageous embodiment is characterized in that a cross-sectional area of the shaft oriented perpendicular to the fastening direction has external dimensions which increase steadily along the fastening direction starting from the end face. Preferably, the cross-sectional area has the shape of a circle, wherein the outer dimensions comprise a diameter of the circle. Particularly preferably, the circumferential surface is in the form of a truncated cone.

An advantageous embodiment is characterized in that the circumferential surface has a plurality of different angles of inclination relative to the fastening direction, starting from the end face against the fastening direction.

An advantageous embodiment is characterized in that an angle of inclination of the circumferential surface relative to the fastening direction is between 1° and 6°. Preferably, the angle of inclination is between 1.5° and 5°, particularly preferably between 2° and 4°.

An advantageous embodiment is characterized in that the end face comprises at its edge an in particular circumferential lead-in chamfer for easier insertion of the shaft into the blind hole. The lead-in chamfer preferably comprises a bevel.

An advantageous embodiment is characterized in that the blind hole diameter remains the same in the depth direction.

An advantageous embodiment is characterized in that the blind hole is drilled in the substrate. Preferably, a depth T of the blind hole is predetermined by means of a drill with a stop. Also preferably, a depth T of the blind hole is predetermined by means of a depth stop.

An advantageous embodiment is characterized in that the blind hole has a depth T with T<10 mm in the depth direction. Preferably, the depth T<8 mm, more preferably the depth T<6 mm.

An advantageous embodiment is characterized in that the shaft is driven in a linear manner into the blind hole. Preferably, a bolt-firing tool is used for this purpose.

An advantageous embodiment is characterized in that a driving angle between a surface of the substrate and the depth direction is at least 80°. The driving angle is preferably at least 85°, particularly preferably 90°.

An advantageous embodiment is characterized in that the first material comprises a metal or an alloy. Particularly preferably, the first material consists of a metal or an alloy.

An advantageous embodiment is characterized in that the substrate material comprises a metal or an alloy. Particularly preferably, the substrate material consists of a metal or an alloy.

BRIEF DESCRIPTION OF THE SEVERAL VIEWS OF THE DRAWINGS

The invention is explained in more detail below on the basis of embodiments with reference to the drawings. in which.

DETAILED DESCRIPTION OF THE INVENTION

Figure 1:
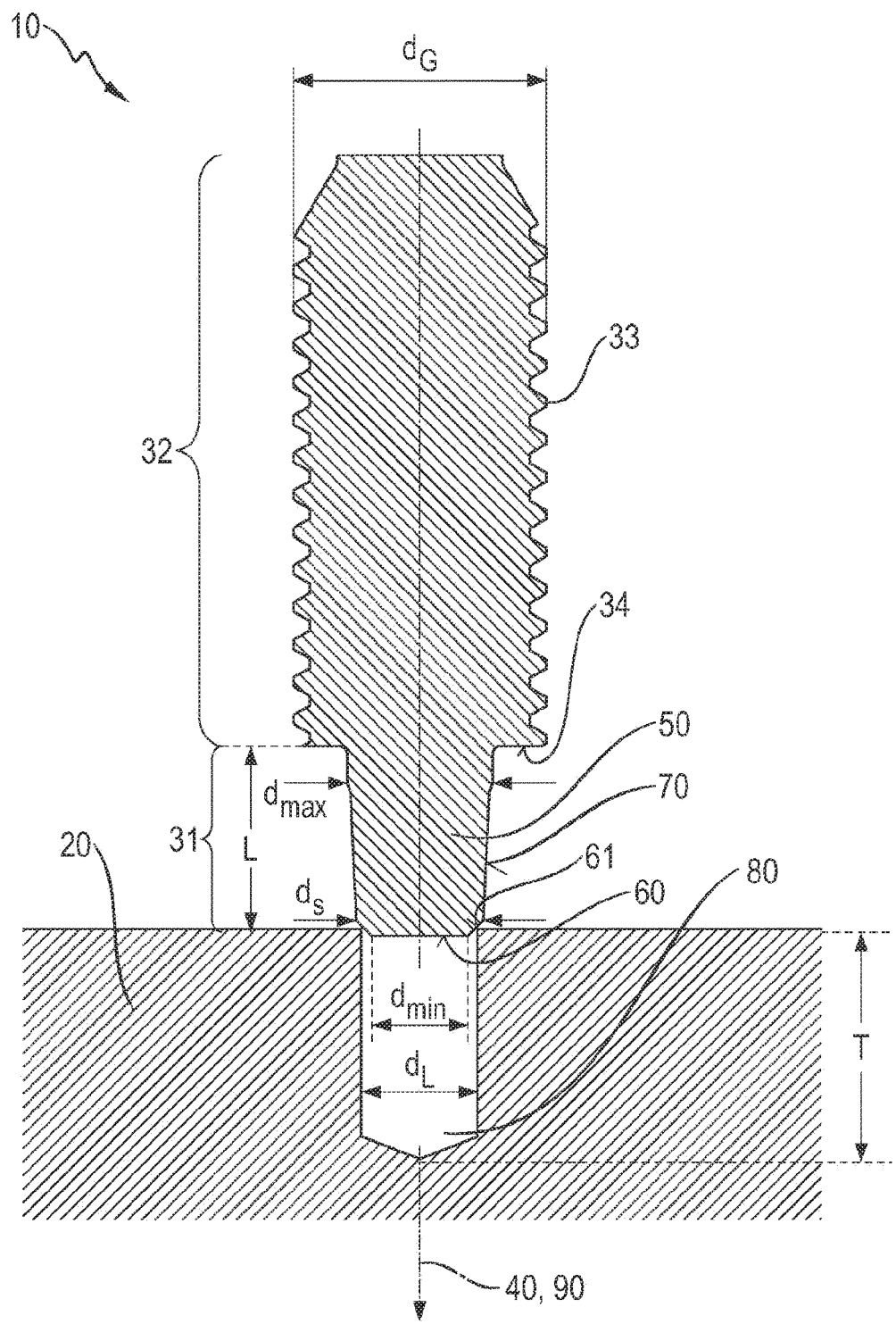
FIG. 1 shows a fastening system in a cross-sectional view.

FIG. 1 shows a fastening system 10 having a substrate 20 consisting of a substrate material and a fastening element 30. The fastening element 30 has an anchoring region 31 and a connecting region 32 protruding from the base element after the anchoring. The anchoring region 31 serves to anchor the fastening element 30 in the substrate 20, and the connecting region 32 serves to connect an attachment (not shown) to the fastening element 30. For this purpose, the connecting region 32 has an external thread 33 with a thread diameter $d_G$ of, for example, 8 mm or 10 mm. By contrast, the anchoring region 31 has a smaller outer diameter, so that the fastening element 30 has a stop shoulder 34 between the anchoring region 31 and the connecting region 32. The stop shoulder 34 rests on a surface 21 of the substrate 20, specifically directly or optionally indirectly by means of a gasket (not shown) when the anchoring region 31 is anchored in the substrate 20.

The anchoring region 31 comprises a shaft 50 which defines a fastening direction 40 and has an end face 60 having an end face diameter ds pointing substantially in the fastening direction 40 and having a circumferential surface 70 adjoining directly to the end face 60. A cross-sectional area of the shaft 50 oriented perpendicular to the fastening direction 40 has the shape of a circle, the diameter of which increases steadily and uniformly against the fastening direction 40 starting from the end face 60, so that the circumferential surface 70 has the shape of a truncated cone. A cone opening angle of this truncated cone is 6°, so that the circumferential surface 70 is inclined relative to the fastening direction 40 by an angle of 3°. The diameter of the cross-sectional area of the shaft 50 then increases from the end face diameter ds to a maximum shaft diameter $d_{max}$. The end face diameter ds is, for example, 4.3 mm, 4.9 mm or 5.0 mm, the maximum shaft diameter $d_{max}$ is, for example, 5.2 mm, 5.4 mm or 5.8 mm, each with a shaft length L of, for example, 6.7 mm or 7.5 mm.

The anchoring region 31 and the connecting region 32 are integrally made of a weldable first material, such as a metal or an alloy such as steel. The substrate material also comprises a weldable material, such as metal or an alloy such as steel. The substrate 20 comprises in particular a coating arranged on the surface thereof, for example a corrosion protection layer which preferably also comprises a weldable material such as metal or an alloy such as steel.

For fastening the fastening element 30 to the substrate 20, a blind hole 80 defining a depth direction 90 is first drilled into the substrate 20 with a blind hole diameter & which is constant in the depth direction 90 and with a depth T. The blind hole diameter & and the depth T are preferably predetermined by means of a step drill. The depth T is, for example, 6 mm, the blind hole diameter & is preferably at least 0.1 mm smaller than the end face diameter ds, particularly preferably at least 0.2 mm smaller than the end face diameter ds, for example 0.2 mm, 0.25 mm or 0.3 mm smaller than the end face diameter ds. Preferably, the blind hole diameter & is less than 0.98 times the end face diameter ds, particularly preferably less than 0.96 times the end face diameter ds. Thereafter, the shaft 50 is driven in a linear manner into the blind hole 80, for example using a bolt-firing tool. A driving angle between the surface 21 of the substrate 20 and the depth direction 90 is 90°, so that the fastening direction 40 coincides with the depth direction 90.

As a result of the fact that the blind hole diameter & is smaller than the end face diameter ds, when driven into the blind hole 80 the shaft 50 displaces a part of the substrate material in the depth direction 90. The resulting heat causes the shaft 50 at the circumferential surface 70 to weld to the substrate 20 at the borehole 80. Due to the inclination of the circumferential surface 70 with respect to the fastening direction 40, this welding and/or a tensioning of the shaft 50 in the blind hole 80 is improved and a holding force of the fastening element 30 on the substrate 20 is increased.

A significant increase in the holding force of the fastening element to the substrate is observed at an inclination angle of the circumferential surface relative to the fastening direction greater than 1°, wherein at an inclination angle greater than 6°, the energy required for the displacement of the substrate material increases significantly at the expense of the welding. For example, with a conventional driving energy of 80 joules, the angle of inclination of the circumferential surface relative to the fastening direction is therefore advantageously between 1° and 6°. Preferably, the angle of inclination is between 1.5° and 5°, particularly preferably between 2° and 4°.

The end face 60 comprises at its edge a lead-in chamfer 61 formed as a circumferential bevel for facilitating insertion of the shaft 50 into the blind hole 80. A minimum diameter $d_{min}$ of the lead-in chamfer 61 is advantageously smaller than the blind hole diameter $d_L$. A cone opening angle of the lead-in chamfer 61 is preferably between 60° and 150°, particularly preferably between 75° and 135°, for example 90° or 120°.

Figure 2:
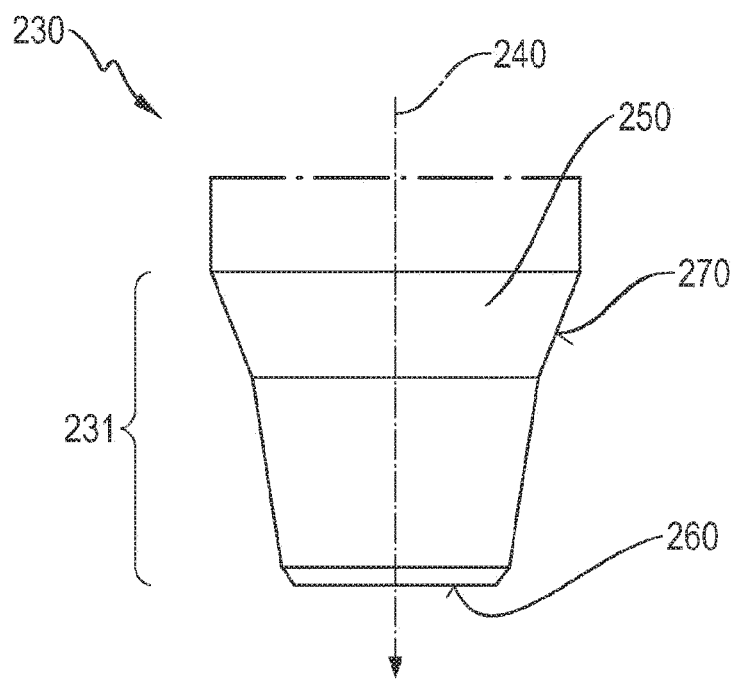
FIG. 2 shows a fastening element in a partial view.

FIG. 2 shows a fastening element 230 in a partial view. The fastening element 230 comprises an anchoring region 231 having a shaft 250 defining a fastening direction 240. The shaft 250 has an end face 260 pointing substantially in the fastening direction 240 and a circumferential surface 270 adjoining directly to the end face 260. The circumferential surface 270 has the shape of a plurality of, in particular precisely two truncated cones, so that the circumferential surface 270 has a plurality of different angles of inclination relative to the fastening direction 240, starting from the end face 260 against the fastening direction 240. A cone opening angle of these truncated cones increases against the fastening direction 240, so that the shaft 250 expands more and more against the fastening direction 240. Incidentally, the fastening element 230 is substantially identical to the fastening element 30 shown in FIG. 1.

Figure 3:
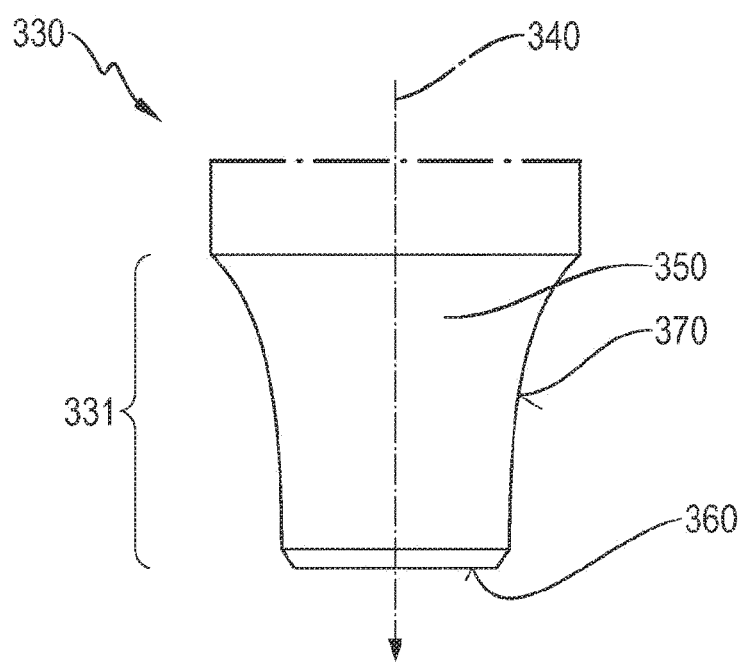
FIG. 3 shows a fastening element in a partial view.

FIG. 3 shows a fastening element 330 in a partial view. The fastening element 330 comprises an anchoring region 331 having a shaft 350 defining a fastening direction 340. The shaft 350 has an end face 360 pointing substantially in the fastening direction 340, and a circumferential surface 370 adjoining directly to the end face 360. The circumferential surface 370 has a gradually increasing inclination angle relative to the fastening direction 340, starting from the end face 360 against the fastening direction 340, so that the shaft 350 widens trumpet-like against the fastening direction 340. Incidentally, the fastening element 330 is substantially identical to the fastening element 30 shown in FIG. 1.

In non-illustrated embodiments, the shaft is widened gradually against the fastening direction, so that the circumferential surface is stepped relative to the fastening direction.

The invention has been described with reference to a method for fastening a fastening element to a substrate. The features of the embodiments described can also be combined with one another as desired within a single fastening system or a single method. It should be noted that the inventive method is also suitable for other purposes.

The invention claimed is:

1. A method of fastening a fastening element consisting of a first material to a substrate consisting of a substrate material, the method comprising:
creating a blind hole defining a depth direction with a blind hole diameter in the substrate,
providing a fastening element which has a shaft defining a fastening direction having an end face pointing in the fastening direction and having a circumferential surface adjoining directly to the end face, wherein the end face has outer dimensions, driving the shaft into the blind hole to anchor the fastening element in the blind hole, wherein the outer dimensions of the end face exceed the blind hole diameter, so that when driven into the blind hole the shaft displaces a part of the substrate material in the depth direction and is welded on the substrate at the circumferential surface, wherein the circumferential surface is slanted relative to the fastening direction, and wherein an angle of inclination of the circumferential surface relative to the fastening direction is between 1° and 6°.

2. The method according to claim 1, wherein the fastening element has an anchoring region, which is anchored in the blind hole and includes the shaft, and a connecting region protruding from the fastening element after the anchoring region, for connecting an attachment to the fastening element.

3. The method according to claim 2, wherein a cross-sectional area of the shaft oriented perpendicular to the fastening direction has external dimensions, which increase steadily along the fastening direction starting from the end face.

4. The method according to claim 2, wherein the circumferential surface has the shape of a truncated cone.

5. The method according to claim 1, wherein a cross-sectional area of the shaft oriented perpendicular to the fastening direction has external dimensions, which increase steadily along the fastening direction starting from the end face.

6. The method according to claim 5, wherein the cross-sectional area has the shape of a circle, and wherein the outer dimensions comprise a diameter of the circle.

7. The method according to claim 5, wherein the circumferential surface has the shape of a truncated cone.

8. The method according to claim 1, wherein the shaft is driven into the blind hole in a linear manner.

9. The method according to claim 8, comprising driving the shaft into the blind hole in a linear manner by a bolt-firing tool.

10. The method according to claim 1, wherein the first material and/or the substrate material comprises a metal or an alloy.

11. The method according to claim 10, wherein the first material and/or the substrate material consists of a metal or an alloy.

12. The method according to claim 1, wherein the circumferential surface has the shape of a truncated cone.

13. The method according to claim 1, wherein the circumferential surface has a plurality of different angles of inclination relative to the fastening direction, starting from the end face against the fastening direction.

14. The method according to claim 1, wherein the outer dimensions of the end face include an end face diameter, and wherein the blind hole diameter is at least 0.1 mm smaller than the end face diameter.

15. The method according to claim 1, wherein the outer dimensions of the end face include an end face diameter, and wherein the blind hole diameter is less than 0.98 times the end face diameter.

16. A fastening system comprising a substrate consisting of a substrate material and a fastening element, which has a shaft defining a fastening direction having an end face pointing in the fastening direction and having a circumferential surface adjoining directly to the end face, wherein the shaft is welded on the substrate, wherein the circumferential surface is slanted relative to the fastening direction, and wherein an angle of inclination of the circumferential surface relative to the fastening direction is between 1° and 6°.

17. The fastening system according to claim 16, wherein a cross-sectional area of the shaft oriented perpendicular to the fastening direction has external dimensions, which increase steadily along the fastening direction starting from the end face.

18. The fastening system according to claim 17, wherein the cross-sectional area has shape of a circle, and has outer dimensions comprising a diameter of the circle.

19. The fastening system according to claim 16, wherein the fastening element has an anchoring region, which is anchored in the blind hole and includes the shaft, and has a connecting region protruding from the fastening element after the anchoring region, for connecting an attachment to the fastening element.

20. The fastening system according to claim 16, wherein the circumferential surface has shape of a truncated cone.

21. The fastening system according to claim 16, wherein the circumferential surface has a plurality of different angles of inclination relative to the fastening direction, starting from the end face against the fastening direction.

22. The fastening system according to claim 16, wherein the first material and/or the substrate material comprises a metal or an alloy.

23. The fastening system according to claim 16, wherein the end face has outer dimensions including an end face diameter, and wherein the shaft is driven into a blind hole to anchor the fastening element in the blind hole, the blind hole having a blind hole diameter, and the blind hole diameter is at least 0.1 mm smaller than the end face diameter.

24. The fastening system according to claim 16, wherein the end face has outer dimensions including an end face diameter, and wherein the shaft is driven into a blind hole to anchor the fastening element in the blind hole, the blind hole having a blind hole diameter, and the blind hole diameter is less than 0.98 times the end face diameter.

25. A method of fastening a fastening element consisting of a first material to a substrate consisting of a substrate material, the method comprising:

creating a blind hole defining a depth direction with a blind hole diameter in the substrate, providing a fastening element which has a shaft defining a fastening direction having an end face pointing in the fastening direction and having a circumferential surface adjoining directly to the end face, wherein the end face has outer dimensions, driving the shaft into the blind hole to anchor the fastening element in the blind hole, wherein the outer dimensions of the end face exceed the blind hole diameter, so that when driven into the blind hole the shaft displaces a part of the substrate material in the depth direction and is welded on the substrate at the circumferential surface, wherein the circumferential surface is stepped relative to the fastening direction, and wherein an angle of inclination of the circumferential surface relative to the fastening direction is between 1° and 6°.

26. A fastening system comprising a substrate consisting of a substrate material and a fastening element, which has a shaft defining a fastening direction having an end face pointing in the fastening direction and having a circumferential surface adjoining directly to the end face, wherein the shaft is welded on the substrate, and wherein the circumferential surface is stepped relative to the fastening direction, wherein an angle of inclination of the circumferential surface relative to the fastening direction is between 1° and 6°.

* * * * *